US006687260B1

United States Patent
Peace

(10) Patent No.: US 6,687,260 B1
(45) Date of Patent: Feb. 3, 2004

(54) APPARATUS AND METHODS FOR FLOW CONTROL OF NON-ISOCHRONOUS DATA

(75) Inventor: Jonathan E. Peace, Plascassier (FR)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/249,456

(22) Filed: Feb. 12, 1999

(51) Int. Cl.[7] ............................................. H04L 12/403
(52) U.S. Cl. ..................... 370/450; 370/465; 370/463
(58) Field of Search ................................. 370/355, 236, 370/462, 362, 434, 395.1, 395.51, 395, 395.61, 438, 439, 450, 451, 395.2, 395.4, 395.5, 229, 235, 468, 521, 474, 395.43, 421, 454; 710/100, 310, 105, 305; 340/825.25, 825.37; 348/552, 734; 379/93.06, 93.07, 93.14

(56) References Cited

U.S. PATENT DOCUMENTS

| | | | | |
|---|---|---|---|---|
| 4,281,380 A | * | 7/1981 | DeMesa et al. | 370/462 |
| 4,433,378 A | * | 2/1984 | Leger | 710/100 |
| 4,845,609 A | * | 7/1989 | Lighthart et al. | 370/450 |
| 5,103,446 A | * | 4/1992 | Fischer | 370/236 |
| 5,159,684 A | * | 10/1992 | Kroll et al. | 710/310 |
| 5,222,062 A | * | 6/1993 | Sharma et al. | 370/434 |
| 5,450,411 A | * | 9/1995 | Heil | 370/395.1 |
| 5,721,725 A | * | 2/1998 | Want et al. | 370/236 |
| 5,787,256 A | * | 7/1998 | Marik et al. | 370/474 |
| 5,933,430 A | * | 8/1999 | Osakabe et al. | 370/421 |
| 5,987,031 A | * | 11/1999 | Miller et al. | 370/395.43 |
| 6,078,783 A | * | 6/2000 | Kawamura et al. | 370/439 |
| 6,100,812 A | * | 8/2000 | Tanaka et al. | 340/825.37 |
| 6,108,718 A | * | 8/2000 | Fujimori et al. | 370/451 |
| 6,151,653 A | * | 11/2000 | Lin et al. | 710/305 |
| 6,233,393 B1 | * | 5/2001 | Yanagihara et al. | 348/552 |
| 6,282,193 B1 | * | 8/2001 | Hluchyj et al. | 370/355 |
| 6,341,319 B1 | * | 1/2002 | Inoue et al. | 710/105 |
| 6,381,239 B1 | * | 4/2002 | Atkinson et al. | 370/362 |
| 6,400,280 B1 | * | 6/2002 | Osakabe | 348/734 |

OTHER PUBLICATIONS

Apr. 30, 1997 News Release from Rockwell Semiconductor Systems entitled "Rockwell Network Access Division to unveil Internatworking roadmap at NetWorld + Interop".

1997 Article by Robyn Aber of 3Com entitled "xDSL: Local Loop Access Technology—Delivering Broadband over Copper Wires".

Oct. 2, 1997 article from Motorola entitled "DSLAM: Digital Subsriber Line Access Multiplexer".

* cited by examiner

*Primary Examiner*—Steven H. D Nguyen
*Assistant Examiner*—Phuongchau Ba Nguyen
(74) *Attorney, Agent, or Firm*—SEED IP Law Group PLLC

(57) ABSTRACT

A data communications system accommodates high transfer rates of non-isochronous data to and from a communications medium handling isochronous data. The system suitably includes an interface for transmitting non-isochronous data to and from a first system, such as a host system, and transmitting isochronous data to and from a second system, such as a WAN. The interface includes a clear-to-send (CTS) signal generated by the system receiving the non-isochronous data. If the CTS signal is asserted, the sending system continues to provide data to the receiving system. On the other hand, if the CTS signal is deactivated, the sending system withholds the non-isochronous data for the relevant channel until the CTS is reasserted. In an exemplary embodiment, the CTS signal is an out-of-band hardware-implemented signal, which tends to provide optimal simplicity and speed.

16 Claims, 3 Drawing Sheets

APPARATUS AND METHODS FOR FLOW CONTROL OF NON-ISOCHRONOUS DATA

BACKGROUND OF THE INVENTION

1. Field of the Invention

The present invention relates to communication systems, and more particularly to apparatus and methods for data flow control in non-isochronous systems.

2. Description of Related Art

With the proliferation of computer systems to homes and businesses, communications technology has also advanced to accommodate the demands of businesses and consumers. Regional telephone companies, local exchange carriers, and internet service providers (ISPs) require greater bandwidth and faster communications to accommodate the needs of their customers. A vital component of the systems used by these companies is the network element connecting the host computer, such as an internet server, to multiple remote computers.

Access concentrators, such as Digital Subscriber Line Access Multiplexers (DSLAMs), are devices that typically provide termination ports for analog modem and integrated service data network (ISDN) dial access. Access concentrator functions generally include accepting multiple logical and/or physical streams of analog samples, formatting these samples into a sequence of frames, transferring the frames into the memory of a host system, providing application functions such as routing and authentication, and transferring the frames to a high speed network interface. To accommodate more users and data and provide superior systems, manufacturers and designers strive to increase the functionality, port densities, and port speeds of their access concentrators. Referring to FIG. 1, a typical conventional access concentrator 18 includes a local area network (LAN) or internetworking interface 51; a host controller 50; and a wide-area network (WAN) interface 20. The LAN interface 51 transfers data to and from the host controller 50 and a LAN. The WAN interface 20 performs several functions for transferring data between a WAN connection, such as a conventional T1/E1 cable, and the host controller 50, including physical termination, signal processing, protocol processing, and input/output (I/O) control for the host controller 50. Both the LAN interface 51 and the WAN interface 20 are connected to the host controller 50 via bus masters 52, typically comprising bus master direct memory access (DMA) interfaces, to delegate control of data transfers.

The WAN interface 20 generally includes multiple asynchronous modems 22, 24, 26, commonly comprising reduced power and board area versions of standard asynchronous client modems. With the multiple asynchronous modems 22, 24, 26, a set of modem I/O processors 28, 30, 32 are typically situated between the asynchronous modems 22, 24, 26 and the host processor 34 in order to transfer and, in some cases format, the asynchronous data, for example in conjunction with an asynchronous-synchronous point-to-point transmission (PPP) system. Each modem I/O processor 28 may handle the traffic for multiple, typically up to sixteen, asynchronous modems 22. ISDN data is routed through a set of separate controllers, such as multichannel HDLC controllers 36, 38, 40, instead of the modem cards 42, 44, 46 because the signal generated by each modem card 42, 44, 46 and the associated protocol processing can only be used for modem tasks.

Conventional modems transfer isochronous data to and from the host system and the WAN. For certain high speed modems, however, the data transfer rate on the host side may be different from the data rate on the line side. The line side for many systems transfers isochronous data at rates according to a selected clock signal. The host side, on the other hand, may transfer data non-isochronously data at rates that vary significantly. Many modern communications systems use data compression techniques to improve the effective transmission rate. The compression ratio, however, may vary according to the compression technique used and the data to be transferred. If the compression is performed by the access concentrator, data compression allows the host controller to transfer data to the access concentrator at a higher rate than the line side transmission rate. The rate at which the data is transferred from the host controller to the access concentrator, however, is typically limited by the lower rate line side transmission rate and the effective compression ratio. If the preceding data does not compress effectively, data transferred to the access concentrator may be lost before the access concentrator-can process and transmit it. On the other hand, if the data rate from the host controller to the access concentrator is reduced to ensure data integrity, the overall data transmission rate is reduced, regardless of the effectiveness of the compression method.

SUMMARY OF THE INVENTION

A data communications system according to various aspects of the present invention accommodates high transfer rates of non-isochronous data to and from a communications medium handling isochronous data. The system suitably includes an interface for transmitting non-isochronous data to and from a first system, such as a host system, and transmitting isochronous data to and from a second system, such as a WAN. The interface includes a clearto-send (CTS) signal generated by the system receiving the non-isochronous data. If the CTS signal is asserted, the sending system continues to provide data to the receiving system. On the other hand, if the CTS signal is deactivated, the sending system withholds the non-isochronous data for the relevant channel until the CTS is reasserted. In an exemplary embodiment, the CTS signal is an out-of-band hardware-implemented signal, which tends to provide optimal simplicity and speed.

BRIEF DESCRIPTION OF THE DRAWINGS

The subject matter of the invention is particularly pointed out and distinctly claimed in the concluding portion of the specification. The invention, however, both as to organization and method of operation, may best be understood by reference to the following description taken in conjunction with the claims and the accompanying drawing, in which like parts may be referred to by like numerals:

DETAILED DESCRIPTION OF A PREFERRED EMBODIMENT

Figure 1:
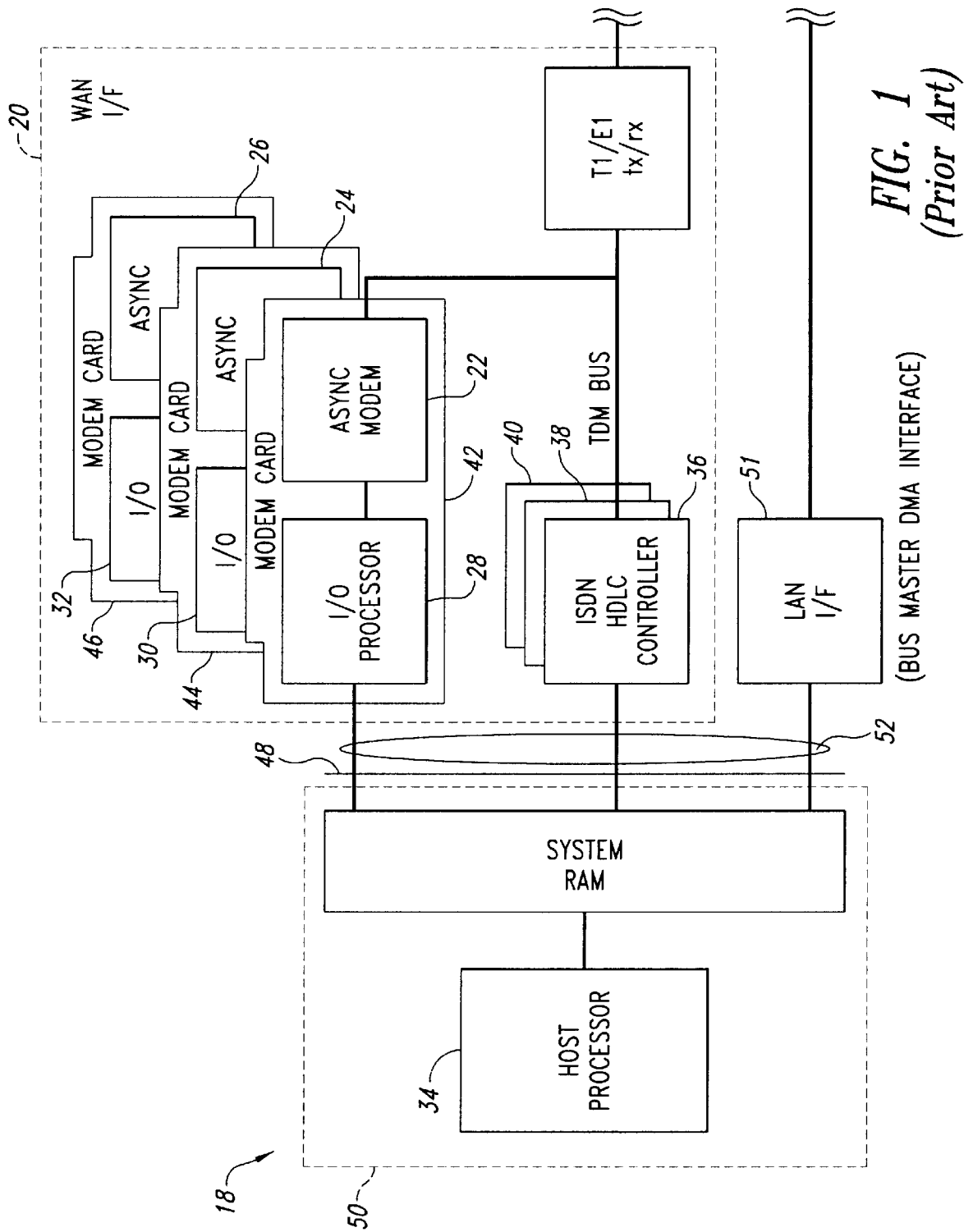
FIG. 1 is a simplified illustration of a typical access concentrator architecture.
Figure 2:
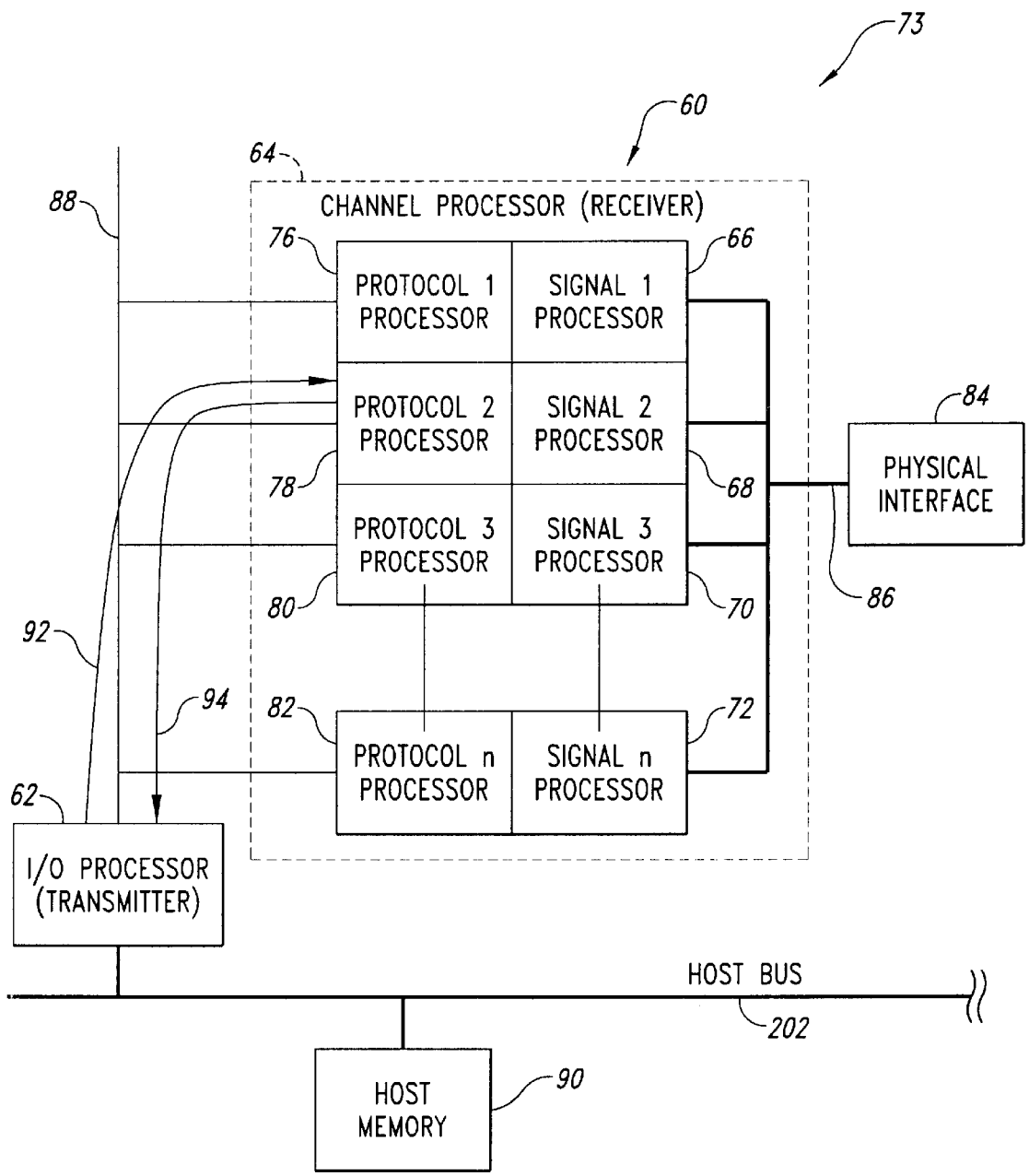
FIG 2 is a Wide-Area Network (WAN) interface of an access concentrator 73 according to a preferred embodiment of the present invention.

The following description of a preferred embodiment is mainly exemplary in nature and is in no way intended to limit the invention or its application or uses. Referring now to FIG. 2, a data transmission system 200 according to various aspects of the present invention comprises a first data transceiver, such as a physical interface 84; an isochronous-nonisochronous data interface, such as a WAN interface 60; and a second data transceiver, such as a host memory 90. For the purposes of the present embodiment, isochronous data refers to data transferred at a single rate over a relatively substantial period of time, whereas nonisochronous data comprises data transferred at potentially variable rates over a substantial period of time.

The host memory 90 suitably comprises any memory, such as a conventional RAM, ROM, hard drive, floppy drive, optical disk, or the like. The host memory 90 is suitably controlled by a host processor (not shown) connected to a host bus 202. Though the present embodiment operates in conjunction with the host memory 90, the second data transceiver may comprise any data source or data receiver capable of operating in conjunction with isochronous or nonisochronous data. The host bus 202, comprising any suitable transmission medium such as a multi-bit bus of conductive wire or fiber optic cable, is also connected to the WAN interface 60 for transferring data between the WAN interface and the host memory 90 or other components attached to the host bus.

The first data transceiver may also comprise any data source or data receiver capable of operating in conjunction with isochronous or nonisochronous data. In the present embodiment, the physical interface 84, provides a physical connection between the data transmission system 200 and a communications medium 86 connected to the first data transceiver, such as a telephone network, a wide-area network, an ISP server, or any other appropriate data source or receiver. Data to and from the physical interface 84 typically comprises isochronous data.

The data interface is connected between the first and second data transceivers to facilitate the transfer of isochronous and nonisochronous data. In the present embodiment, the WAN interface 60, suitably comprising a portion of an access concentrator 73, is suitably connected to the physical interface 84 to facilitate the transfer of data between the host bus 202 and the physical interface 84. Isochronous (i.e., fixed rate) data, for example streamed analog data, suitably travels between the WAN interface 60 and the physical interface 84 via a line-side communications medium, such as a line-side time-division multiplexed (TDM) bus 86. The physical interface 84 may transfer data on any suitable number of physical or logical channels 86. The data transferred between the host bus 202 and the WAN interface 60, on the other hand, preferably comprises non-isochronous (i.e., variable rate) framed channelized data that is transmitted via a host-side TDM bus 88. Although the line-side and host-side interfaces are configured separately in the present embodiment, it should be noted that the interfaces may be implemented as the same bus.

The WAN interface 60 of the present embodiment suitably performs various functions to relieve the host processor of selected channel processing and I/O processing tasks, including various signal processing and protocol processing functions for both modem data, ISDN data, and any other suitable type of data. The WAN interface 60 may be particularly suited to processing data streams, including HDLC frames. For example, a WAN interface 60 according to the present embodiment may perform tasks including PPP framing, V.34, V.42, asynchronous-asynchronous HDLC processing, PPP encryption, and transmission control protocol (TCP) processing. In addition, the WAN interface 60 performs data compression and decompression, such as in accordance with a STAC compression process, to facilitate higher data transfer rates, for example via the line-side bus 86.

A WAN interface 60 according to various aspects of the present invention suitably comprises an I/O processor 62 and a channel processor 64. The channel processor 64 transfers data to and from the I/O processor 62 and the physical interface 84. The I/O processor 62 transfers data between the channel processor 64 and the host bus 202.

More particularly, the channel processor 64 according to various aspects of the present invention performs various functions to process data prior to transfer to the host memory 90, including signal processing and protocol processing functions. Accordingly, the channel processor 64 suitably includes at least one signal processor 66, suitably multiple signal processors 68, 70, 72, for various signal processing tasks. Similarly, various protocol processing tasks are conducted by multiple protocol processors 76, 78, 80, 82. Any appropriate number of signal processors 66, 68, 70, 72 and protocol processors 76, 78, 80, 82 may be included in the channel processor 64. In the present embodiment, each individual signal processor 66, 68, 70, 72 corresponds to an individual protocol processor 76, 78, 80, 82. In addition, each signal processor 66, 68, 70, 72 suitably processes one or more logical channels.

For example, if the WAN interface 60 is receiving a conventional dial-up modem call, components of the channel processor 64, such as the signal processors 66, 68, 70, 72, perform appropriate signal processing of data, for example V.34 and V.42 signal processing. The channel processor 64 also performs appropriate protocol processing, such as asynchronous-asynchronous HDLC processing, PPP framing, PPP encryption, STAC compression, and transmission control protocol (TCP), suitably-by the protocol processors 76, 78, 80, 82. By assigning various signal processing and protocol processing functions to the channel processor 64, the host system is relieved of substantial channel-related processing and dedicated to the tasks to which it is best adapted, including authentication, routing, management and applications. It should be noted that in various embodiments, particularly those adapted to enhanced scalability, it is preferable to have fewer channels per channel processor 64 with each channel processor 64 performing most of the channel processing tasks, instead of each channel processor 64 supporting a large number of channels with only a portion of the channel processing tasks completed.

The channel processor 64 processes incoming signals from the I/O processor 62, compresses the data according to an appropriate compression process, and transmits the output data to the physical interface 84 via the multiple physical and logical channels. The I/O processor 62 retrieves data via the host bus 202, for example from host memory 90, suitably in multi-bit form, such as 32-bit words. The I/O processor suitably converts the multi-bit data into a serial format and provides the serial data to the channel processor 64. In the present embodiment, the I/O processor 62 operates as a bus master for the host bus 202, and suitably comprises a Multichannel Synchronous Communications Controller (MUSYCC™), such as a bt8478 MUSYCC™, manufactured by Rockwell Semiconductor Systems, which autonomously transfers the HDLC frames to and from the host memory 90. The MUSYCC formats and deformats up to 256 HDLC channels in a single complimentary metal-oxide semiconductor (CMOS) integrated circuit. The MUSYCC provides a number of interfaces, such as eight interfaces, to a corresponding number of independent serial data streams (such as T1/E1 signals) and transfers data from the host memory 90 across the host bus 202, which suitably comprises a 32-bit peripheral component interconnect (PCI) bus, to the I/O processor 62. Data is suitably transmitted at a selected rate, such as up to 33 MHz, using a linked list of buffer descriptors. Such an implementation facilitates management of a large number of channels with relatively few bus mastering devices. It also allows exchanging the numbers of channels for enhanced or reduced channel throughput speeds, depending on the limitations of the host processor bus. Thus, when it is desirable to increase port speed, the serial clock rate of the controller may be increased while the overall system architecture remains unchanged.

Increasing the functionality of the channel processor 64 to perform various channel processing functions may affect the data flow rate between the channel processor 64 and the host system. As a result, the host-side data rate to and from the channel processor 64 may be higher than the line-side rate. Further, instances may occur in which the WAN interface 60 cannot transfer data to the physical interface 84, for example due to other tasks occupying the physical interface 84. Consequently, the data flow between the WAN interface, the host system, and the physical interface 84 may be managed according to any suitable technique.

In the present embodiment, to accommodate higher data rates of the host system and variations in the data rate to and from the the WAN interface 60, the WAN interface 60 is preferably implemented in conjunction with a data compression system and a flow control system. For example, the channel processor 64 may transmit data to the physical interface 84 as V.42bis compressed data according to a conventional K.56 transfer scheme. The data rate on the line-side bus 86 is suitably 64 Kbps, such as in the form of pulse code modulation (PCM) samples. In the present embodiment, data is provided to the protocol processor, which suitably performs compression and modulation of the data, such as implementing pulse code modulation (PCM). The PCM encoder of the protocol processor 76 transmits the compressed data at 56 Kbps. If the maximum compression ratio of the data is 3:1, the data rate between the I/O processor 62 and the protocol processors 76, 78, 80, 82 may be as high as 3*56 Kbps, or 168 Kbps.

Because the host side data on the host-side TDM bus is non-isochronous, framed, channelized data, the flow of the data to the channel processor 64 is suitably controlled to prevent overloading of the channel processor 64. More specifically, the compression process presents flow control issues as the synchronous interfaces to the protocol processors 76, 78, 80, 82 may have larger capacities than the line can handle, thus leading to potential transmit overruns. This is especially true if the data is incompressible or a retrain occurs.

Data flow may be controlled in any suitable manner, including in-band software, out-of-band software, in-band hardware, and out-of-band hardware control systems. To maintain simplicity and speed and to conserve processor resources, a data communication system according to various aspects of the present invention includes a hardware flow control system using an out-of-band scheme. The out-of-band scheme is typically less expensive to implement than in-band hardware protocol approaches. The out-of-band hardware flow control of the present system is applied in the context of the WAN Interface 60 of FIG. 2. In the present embodiment, similar flow control systems may be applicable to any system, particularly systems processing non-isochronous framed channelized data.

An out-of-band hardware flow control system according to various aspects of the present invention regulates the transmission of data to the channel processor 64 (receiver) from the I/O processor 62 (transmitter), though the direction of flow control may be reversed. The channel processor 64 generates a suitable flow control signal (illustrated by arrow 94) to signify the ability to accept data for the timeslot duration of the individual channel to which the channel processor 64 is currently dedicated. The I/O processor 62 suitably samples the flow control signal at the end of each transmitted data frame of each channel. In the event that the flow control signal is active, the I/O processor 62 continues sending the next frame without delay (illustrated by arrow 94). Otherwise, interframe fill is suitably sent until the flow control signal received by the I/O processor 62 indicates that the channel processor 64 is able to accept data for the particular channel.

For example, the flow control signal indicating the ability of the channel processor 64 to accept data for a particular channel may be a hardware-generated Channelized Clear To Send (CCTS) signal. The CCTS signal is suitably synchronized with the TDM data sent from the I/O processor 62 to the channel processor 64 on the host-side TDM bus 88. In the event that the channel processor 64 cannot accept frames from the I/O processor 62, the channel processor 64 drives the CCTS signal to an inactive state. In response, the I/O Processor 62 idles at the end of the current frame of the channel under consideration, until such time as the CCTS signal is again active for that particular channel.

Figure 3:
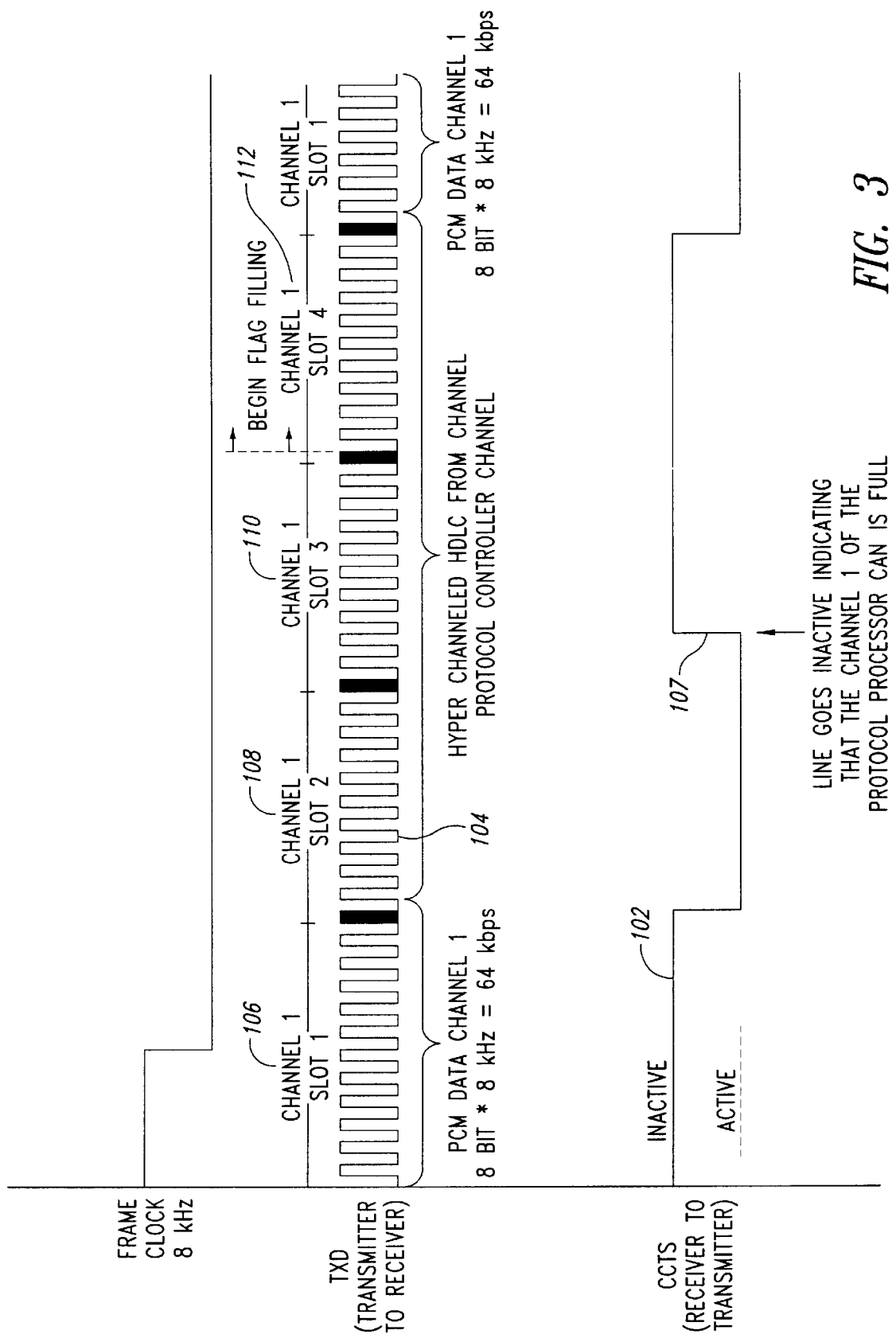
FIG. 3 is a timing diagram illustrating an exemplary technique to provide flow control of non-isochronous framed channelized data.

Referring to FIGS. 2 and 3, the flow control system of the present embodiment may be implemented for a 32-channel, 64 Kbps modem stream on an E1 interface. The host-side TDM bus 88 suitably operates at four times the E1 rate. This translates to 128 8-bit timeslots at 8 KHz for a bit rate of 8 MHz. Therefore, each of the 32 Channels has four 8-bit slots on the TDM bus. The first timeslot 106 is suitably used for PCM data from the E1 physical interface 84 to the channel processor 64 and I/O processor 62 should it be required to transmit PCM signals directly from the host memory 90 to the line (e.g., in conjunction with certain telephone applications). The second timeslot 108, third timeslot 110, and fourth timeslot 112 are used for the decompressed framed data from the protocol processor of a particular channel from the I/O processor 62. These three timeslots 108, 110, 112 are hyperchanneled together to form one logical bitstream of 192 Kbps, which is typically sufficient for conventional lossless compression techniques.

The CCTS signal 102 that is generated by each protocol processor is synchronized with each channel or hyperchannel of the non-isochronous framed data 104, as defined in the communicating entity's TDM timeslot map. When channel one of the protocol processor 76 is unable to accept additional data, the CCTS signal 102 changes state to indicate an inactive mode (see illustrative state transition 107). As the I/O processor 62 monitors the CCTS signal 102, interframe filler may be provided at the end of the frame until the CCTS signal 102 is active for the particular slot.

As previously indicated, the Bt8478 MUSYCC™ suitably provides a CCTS mode for flow control of non-isochronous framed channelized data. A complete description of this device can be found in the Bt8478 MUSYCCυ specification manual published by Rockwell Semiconductor Systems. In addition, the design changes to the Bt8478 MUSYCC™ that provide this unique flow control protocol are provided in Appendix A.

From the foregoing, it can be seen that an access concentrator may be provided that supports the baseline functions required in the industry yet has increased functionality and the ability to support higher port densities and elevated port speeds. Furthermore, the host processor is amortized over as many channels as possible such that cost, power and physical side of the access concentrator package are reduced. In addition, an innovative flow technique may be used when non-isochronous framed channelized data is passed between two entities. The broad teachings of the present invention can be implemented in a variety of forms. Therefore, the true scope of the invention is vast, and other modifications will become apparent to the skilled practitioner upon a study of the drawings, specification, and following claims.

APPENDIX "A"

Modifications to the bt8478 MUSYCC™

1. Binodal definition of ROOF [3:0] input pins to operate as either ROOF or CTS inputs. This entails routing the signal from each ROOF/CTS input pin to a latch that is accessible by the respective Transmit Bit Level Processor (TBLP).
2. The CTS input signal latch is clocked on the same TCLK edge selected from the TSYNC input signal. This latch may also require further internal resynchronization to align the CTS input signal with the TDAT data output.
3. Addition of CCTS mode control register bit 14 in Group Configuration Descriptor. When CCTS mode is enable (high), the respective ROOF input pin is redefined to operate as a CTS input pin. This requires adding two gates per group, one gate to enable the ROOF input signal to its respective receiver while CCTS is low, the other gate enables CTS to its respective transmitter while CCTS is high. Gated ROOF/CTS signals are forced inactive (low) while CCTS is in the opposite state.
4. For backward compatibility, all CCTS mode control register bits default to zero upon soft chip reset or group reset. Thus, after reset, all ROOF inputs are enabled and all CTS inputs are disabled.
5. One new TBLP state (CTS_OFF) is added for each channel within a group that has CCTS mode enabled. The CTS_OFF state is entered on any FCS transmit channel whose CTS input is inactive after the programmed number of idle characters have been transmitted. During CTS_OFF state, the transmit channel continues to send idle until the CTS input is sampled active high, which exits CTS_OFF. Upon exiting CTS_OFF, the transmit channel proceeds through the normal subsequent channel states until the next idle character transmitted and CTS is resampled. CTS is typically sampled only during transmission of the eighth bit of the last idle character. The last idle character may appear on the serial channel as either the closing FLAG at the end of message (when PADEN=0), or as the last interframe fill character sent according to the PADCNT variable (when PADEN=1). (Note: Depending on further analysis of the TBLP state machine, the actual CTS input sampling times may be modified to simplify the CTS_OFF state implementation. For example, CTS might be sampled during every bit of every idle character or only during the seventh bit of each idle character if that simplifies the TBLP state machine.

From a serial port interface perspective:
1. The CTS input signal must meet the setup/hold timing selected for the TSYNC input.
2. CTS must be applied (either active or inactive) for the duration of timeslot bits assigned to a particular logical channel since the modem controller may not be able to determine which serial channel bit contains the last (or next to last) bit of the last idle character.
3. CTS assertion during an in-progress message transfer will not affect that message's transmission. CTS assertion only causes the transmitter to stop sending message data (for the respective channel) after the in-progress message has been completely sent and at least one idle (FLAG) character has been sent.
4. CTS negation allows the next message to start. The minimum time from CTS negation to the first bit of the opening FLAG character may be as little as 1 TCLK cycle.

What is claimed is:

1. A data transmission system, comprising:

a data source;

a data receiver; and an interface coupled between said data source and said data receiver, said interface including:

an I/O processor coupled to said data source and configured to substantially continuously allow the transfer of data from said data source to said data receiver in response to a clear-to-send signal in an active state and delay transfer of data in response to the clear to send signal in an inactive state, and a channel processor comprising a plurality of protocol processors and signal processors, wherein the plurality of protocol processors coupled to the I/O processor, the protocol processors configured to control transfer of the data by said I/O processor from said data source to said data receiver, wherein each respective protocol processor substantially autonomously drives the clear-to-send signal to the inactive state when the respective protocol processor is not ready to receive data from said data receiver, the I/O processor permitting transfer of data when the clear-to-send signal is in an active state and preventing the transfer of data when the clear-to-send signal is in an inactive state.

2. The data transmission system of claim 1 wherein said data receiver comprises a physical interface configured to receive and transfer data from said data source.

3. The data transmission system of claim 2 wherein said data is transferred isochronously.

4. The data transmission system of claim 1 wherein said data source comprises a host memory configured to store said data and transfer said data non-isochronously.

5. The data transmission system of claim 1 wherein said interface comprises an access concentrator.

6. The data transmission system of claim 1 wherein said clear-to-send signal is suitably synchronized with said data from at least one device selected from the group consisting of said I/O processor and said channel processor.

7. The data transmission system of claim 1 wherein said channel processor comprises at least one signal processor and at least one protocol processor.

8. The data transmission system of claim 1 wherein said interface is implemented with at least one scheme from the group consisting of a data compression scheme and a flow control scheme.

9. The data transmission system of claim 8 wherein the flow control scheme comprises an out-of-band hardware scheme.

10. The data transmission system of claim 9 wherein said flow control scheme regulates the transmission of data between said channel processor and said I/O processor, and said channel processor is configured to generate a flow control signal capable of signifying when said I/O processor should continue sending data without a delay.

11. The data transmission system of claim 1 wherein
said data receiver comprises a physical interface configured to receive and transfer data;
said data source comprises a host memory configured to store said data and transfer said data non-isochronously;
said channel processor comprises at least one signal processor and at least one protocol processor;
said interface is implemented with at least one scheme selected from the group consisting of a data compression scheme a flow control scheme.

12. The data transmission system of claim 11 wherein said flow control scheme comprises an out-of-band hardware scheme.

13. The system according to claim 1 wherein said I/O processor is responsive to a plurality of clear-to-send signals, permitting the transfer of data to a first respective channel when the clear-to-send signal is generated while preventing the transfer of data to a second respective channel when its clear-to-send signal is not generated.

14. A method for transferring data between a source and a receiver, comprising the steps of:
configuring the receiver to receive and transfer the data isochronously;
configuring the source to store the data and to transfer the data non-isochronously;
coupling a WAN interface between the source and the receiver wherein said WAN interface compresses the data and provides flow control of all of the data between the source and the receiver;
sampling a plurality of clear-to-send signals generated by said WAN interface, at least some of the signals having an active state and some of the signals having an inactive state, said sampling in synchrony with isochronous parameters;
transferring data from the source to a respective channel of the receiver only when the respective clear-to-send signal is active for that particular channel;
coupling a medium between said WAN interface and the source such that said medium is configured as a multi-channel bus;
configuring said WAN interface to include an I/O processor and a channel processor;
synchronizing said clear-to-send signal with the data from at least one device selected from said I/O processor and said channel processor;
operating said I/O processor as a multi-channel synchronous communications controller;
configuring said channel processor to include at least one device selected from a signal processor and a protocol processor;
implementing said flow control as an out-of-band hardware scheme; and
transferring data from the source to the receiver using at least one device selected from the group comprising a multiple channel modem, a modem stream interface having a transfer rate of less than a 64 Kbps, and an E1 interface.

15. The method of claim 14 further comprising the step of implementing said flow control as an out-of-band hardware scheme.

16. A method for transferring data between a source and a receiver, comprising the steps of:
configuring the receiver to receive and transfer the data isochronously;
configuring the source to store the data and to transfer the data non-isochronously;
coupling a medium between a WAN interface and the source such that said medium is configured as a multi-channel bus;
coupling said WAN interface between the source and the receiver wherein said WAN interface compresses the data and provides flow control of the data between the source and the receiver;
sampling a clear-to-send signal generated by said WAN interface having an active state and an inactive state;
transferring data from the source to the receiver only when said clear-to-send signal is active;
configuring said WAN interface to include an I/O processor and a channel processor;
synchronizing said clear-to-send signal with the data from at least one device selected from said I/O processor and said channel processor;
operating said I/O processor as a multi-channel synchronous communications controller;
configuring said channel processor to include at least one device selected from a signal processor and a protocol processor;
implementing said flow control as an out-of-band hardware scheme; and
transferring said data from the source to the receiver using at least one device selected from the group comprising a multi-channel modem, a modem stream interface having a transfer rate of less than a 64 Kbps, and an E1 interface.

* * * * *